US009681603B2

(12) United States Patent
McClure et al.

(10) Patent No.: US 9,681,603 B2
(45) Date of Patent: Jun. 20, 2017

(54) CAM ACTION WINDGUARD

(71) Applicant: CNH Industrial America LLC, New Holland, PA (US)

(72) Inventors: John R. McClure, New Holland, PA (US); William Dale Hotaling, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 45 days.

(21) Appl. No.: 14/214,349

(22) Filed: Mar. 14, 2014

(65) Prior Publication Data

US 2014/0260167 A1 Sep. 18, 2014

Related U.S. Application Data

(60) Provisional application No. 61/800,139, filed on Mar. 15, 2013.

(51) Int. Cl.
*A01D 34/00* (2006.01)
*A01D 89/00* (2006.01)

(52) U.S. Cl.
CPC ......... *A01D 34/001* (2013.01); *A01D 89/008* (2013.01)

(58) Field of Classification Search
CPC ..... A01D 89/00–89/009; A01D 34/001; A01F 15/10; A01F 15/106
See application file for complete search history.

(56) References Cited

U.S. PATENT DOCUMENTS

| | | | |
|---|---|---|---|
| 2,872,772 A | 2/1959 | Nolt | |
| 4,411,127 A * | 10/1983 | Diederich et al. | 56/364 |
| 4,446,684 A * | 5/1984 | Frimml et al. | 56/341 |
| 4,495,756 A * | 1/1985 | Greiner et al. | 56/364 |
| 6,295,797 B1 | 10/2001 | Naaktgeboren et al. | |
| 6,688,092 B2 | 2/2004 | Anstey et al. | |
| 6,877,304 B1 | 4/2005 | Smith et al. | |
| 6,962,041 B1 | 11/2005 | Taylor et al. | |
| 7,107,748 B2 | 9/2006 | McClure | |
| 7,448,196 B2 * | 11/2008 | Schrag et al. | 56/341 |
| 7,617,662 B2 * | 11/2009 | Erdmann et al. | 56/190 |
| 7,650,741 B2 * | 1/2010 | Graber et al. | 56/364 |
| 7,654,069 B1 * | 2/2010 | Dunham et al. | 56/190 |
| 7,716,910 B2 * | 5/2010 | Woodford | 56/364 |
| 7,730,704 B2 * | 6/2010 | Viaud | 56/16.1 |
| 2006/0277888 A1 * | 12/2006 | Erdmann et al. | 56/344 |
| 2008/0264028 A1 * | 10/2008 | Woodford | 56/16.4 R |
| 2014/0250855 A1 * | 9/2014 | Vandamme et al. | 56/379 |

\* cited by examiner

*Primary Examiner* — Robert Pezzuto
*Assistant Examiner* — Adam Behrens
(74) *Attorney, Agent, or Firm* — Patrick M. Sheldrake

(57) ABSTRACT

A windguard is provided that may be used with an agricultural harvester, such as around baler, waste baler, combine, sugarcane harvester or cotton harvester. More particularly, the windguard utilizes at least a first and a second pivot tab, each comprising a cam that is adapted for alignment into a slot along a first and second side arms of the windguard and that allows a upward or downward movement of the pivot tabs in the slot. The sliding motion of the cam in the slot allows the windguard to automatically adjust during operation without manual adjustment or pre-adjustment prior to operation.

17 Claims, 7 Drawing Sheets

CAM ACTION WINDGUARD

TECHNOLOGY FIELD

The present invention relates to an apparatus for the efficient harvesting of crop in an agricultural harvester, and more particularly, to a windguard apparatus comprising a first and second pivot tab pivotally mounted around the axis of a transverse member and adapted for alignment with an elongate slot on a pair of side arms that allow sliding movement of the pivot tab within the elongate slot. The windguard allows the sliding movement, or cam action, to raise and lower pitch of windguard without manual adjustment prior to or during operation of the apparatus.

BACKGROUND

Conventional windguards are fairly simple structures, and include an elongated pipe-like member, often referred to as a windguard pipe, extending across the front of the pickup mechanism with a plurality of tines attached to the windguard pipe along its length extending rearwardly over the pickup mechanism. This type of windguard may be manually adjusted for different sizes of windrows of crop material by positioning the windguard pipe and the tines closer to the pickup mechanism for small windrows or farther away from the pickup mechanism for large windrows. If the windguard is adjusted for small windrows and a large windrow is encountered, the windguard pipe and tines may be too close to the pickup mechanism to accommodate the large windrow. This could cause plugging of the pickup mechanism. If the windguard is adjusted for large windrows and a small windrow is encountered, the windguard tines may be too far away from the pickup mechanism to protect the small windrow. This could result in wind loss of crop material, or, as mentioned above, difficulties in starting the bale core.

Floating windguards can still impede adequate crop material harvesting in the pickup mechanism due to the ends of the windguard tines obstructing the pickup guard as the pickup tines rotate in operation.

SUMMARY OF THE INVENTION

The invention relates to a crop collection system comprising a pickup assembly comprising a pair of oppositely positioned sidewalls, wherein each sidewall comprises at least one cam positioned on the outside lateral faces of the sidewall; and a windguard comprising a first and a second side arm; and a transverse member relative to the first and second side arms; wherein the first and the second side arms comprising a first hole disposed at or proximate to its rearmost end, a second hole disposed at or proximate to its front end; and wherein the first and second side arms define a space within which the transverse member is rotatably mounted at the second hole of the first and second side arms; wherein the first and the second side arms are in operable contact with the at least one cam.

In some embodiments the crop collection system also relates to the windguard further comprising a first and a second pivot tab; wherein the first and the second side arms comprise an elongate slot disposed proximate to the front end of the first and second side arms and behind the second hole; wherein the first and the second pivot tabs are affixed to, operably coupled or mechanically linked around opposite end of the transverse member adjacent to the inside face of the first and second side arms and wherein the first and second pivot tabs comprise a windguard cam adapted to slide within the elongate slot of the first and second side arms; and wherein the windguard further comprises a second transverse member rotatably mounted between a pair of laterally spaced end plates rigidly affixed to the front end of the first and second side arms.

In some embodiments the crop collection system also relates to a transverse member that supports one or a plurality of tines extending rearwardly; a elongate slots of the first and second side arms that allows for radial movement of the first and second pivot tabs and rotational movement of the transverse member relative to an axis defined by the transverse member; a second transverse member comprising a cylindrically shaped surface and one or a plurality of evenly spaced tread lines extending lengthwise on the cylindrically shaped surface; the length of the first and second transverse members are substantially the same; a pickup assembly that further comprises a pickup guard and the pickup assembly is attached to the windguard at the first hole of the first and second sidearms; the first hole of the first and second sidearms defines a pivot point such that, upon, operation, the windguard can automatically adjust its position through rolling contact between the first and second side arms and the cam to maintain a constant distance between the times of the windguard and the pickup guard.

In some embodiments the crop collection system also relates to the first and second side arms that have tapered bottom edges from front to back and both the first and second sidearms are in operable contact with a pair of cams, each of which is positioned on the outside lateral face of the sidewalls of the pick assembly, such that, upon operation, the windguard can automatically adjust its position with the pickup assembly through rolling contact between (i) the first and second side arms and (ii) the pair of cams to maintain a predetermined, unobstructed distance between the windguard and the pickup guard; the pickup assembly and windguard where both are rotatably mounted to a frame of an agricultural harvester; at least a portion of the shape of the sidearm of the windguard is tapered such that the raising and lowering of the pickup adjusts the position of the windguard with respect to the cam such that a distance is generally maintained between a lower surface of the tines and an upper surface of the pickup; the lower shape of at least one sidearm, and optionally both, that is configured for contact with the cam and tapered upwardly with respect to a crop flow direction; a lower portion of the sidearm of the windguard that is shaped to have at least three separately shaped stages configured for corresponding contact with the cam when the pickup is in a lowered position, a raised position and a transition position therebetween; and at least one sidearm of the windguard that is tapered at least in a middle stage corresponding to a transitional position of the pickup.

Aspects of the invention relate to a windguard comprising: a first and a second side arm; and a transverse member relative to the first and second side arms; wherein the first and the second side arms comprise a first hole disposed at or proximate to its rearmost end, a second hole disposed at or proximate to its front end; and wherein the first and second side arms define a space within which the transverse member is rotatably mounted at the second hole of the first and second hole of the first and second side arms; wherein the first and the second side arms are in operable contact with the at least one cam; wherein the first hole of each of the first and second side arms are adapted for mechanical connection to a pickup assembly.

Aspects of the invention relate to an agricultural harvester comprising any of the crop collection systems described herein.

In some embodiments, the agricultural harvester also relates to a selection from the group consisting of: a baler, a cotton harvester, a sugarcane harvester, and a combine; the agricultural harvester that further comprises a pickup assembly adapted for attachment to the windguard by a fastener affixed through the first holes of each of the first or second side arms; wherein the fastener allows pivotal movement of the side arm relative to the pickup assembly; and the agricultural harvester that further comprises a bale chamber.

Aspects of the invention relate to a method of harvesting crop material in an agricultural harvester comprising: contacting crop material with the windguard comprising a cam and a first and second pivot tab, wherein the cam allows radial movement of at least the first pivot tab and the transverse member so that the distance between the windguard and the pick mechanism can adjust automatically during operation.

Additional features and advantages of the invention will be made apparent from the following detailed description of illustrative embodiments that proceeds with reference to the accompanying drawings.

The invention relates to a windguard that comprises: a first and a second side arm that comprise an elongate slot; and a transverse member that extends between the first and the second side arms and that is rotatably mounted at a pivot point at the inside face of the first and the second side arms defined by the axis of the transverse member; wherein at least a first pivot tab is operably coupled, mechanically linked or affixed around the transverse member and the at least first pivot tab comprises a windguard cam adapted to slide in at least one elongate slot of the first or second side arms to cause radial movement of the pivot tab. In some embodiments, the invention relates to a windguard that comprises: a first and a second side arm; a transverse member that extends between the first and the second side arms and that is rotatably mounted at a pivot point at the inside face of the first and the second side arms defined by the axis of the transverse member; wherein In some embodiments, the windguard cam allows radial movement of the pivot tab and the transverse member so that the distance between the windguard and the pickup mechanism can adjust automatically during operation. In some embodiments, the windguard cam allows radial movement of the pivot tab and the transverse member so that the distance between the windguard and the pickup mechanism can adjust during operation accommodate different heights of crop material.

Embodiments of the present invention include a windguard comprising a first and a second side arm, a transverse member relative to the first and second side arms; and a first and a second pivot tab; wherein the first and the second side arms comprise a first hole disposed at or proximate to its front end, and an elongate slot disposed proximate to the front end of the first and second side arm and behind the first hole; wherein the first and second side arms define a space within which the transverse member relative to the first and second side arms is rotatably mounted at the first hole of the first and second side arms; and wherein the first and the second pivot tabs are affixed to, operably coupled to, or mechanically linked around opposite ends of the transverse member adjacent to the inside face of the first and second side arms and wherein the first and second pivot tabs comprise a windguard cam aligned to slide within the elongate slot of the first and second side arms.

Embodiments of the present invention also include a windguard comprising a first and a second side arm, a transverse member relative to the first and second side arms; and a first and a second pivot tab; wherein the first and the second side arms comprise a first hole disposed at or proximate to its rearmost end, a second hole disposed at or proximate to its front end, and an elongate slot disposed proximate to the front end of the first and second side arm and behind the second hole; wherein the first and second side arms define a space within which the transverse member relative to the first and second side arms is rotatably mounted at the second hole of the first and second side arms; and wherein the first and the second pivot tabs are affixed, operably coupled, pivotally mounted or mechanically linked around opposite ends of the transverse member at a position adjacent to the inside face of the first and second side arms and wherein the first and second pivot tabs comprise a windguard cam aligned to slide within the elongate slot of the first and second side arms.

The invention also relates to a windguard comprising: a first and a second side arm, a transverse member relative to the first and second side arms; and a first and a second pivot tab; wherein the first and the second side arms comprise a first hole disposed at or proximate to its rearmost end, a second hole disposed at or proximate to its front end, and an elongate slot disposed proximate to the front end of the first and second side arm and behind the second hole; wherein the first and second side arms define a space within which the transverse member relative to the first and second side arms is rotatably mounted at the second hole of the first and second side arms; and wherein the first and the second pivot tabs are fused, pivotally mounted or mechanically linked around opposite ends of the transverse member adjacent to the inside face of the first and second side arms and wherein the first and second pivot tabs comprise a windguard cam aligned to slide within the elongate slot of the first and second side arms, wherein the windguard further comprises a second transverse member rotatably mounted between a pair of laterally spaced end plates rigidly affixed to the front end of the first and second side arms.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Figure 1A:
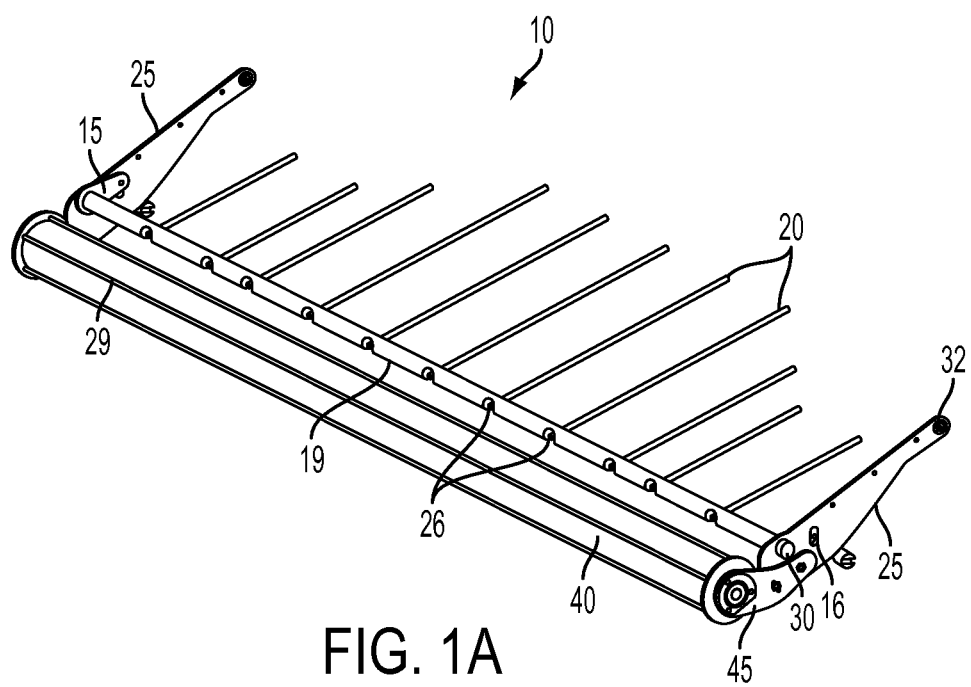
FIG. 1A is a perspective view of a windguard comprising a two pivot tabs operably coupled to a transverse member.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

As used herein the term "a fastener" means a rivet, bolt, peg, screw, wing-nut, dowel, or other elongate structure which can be fastened transversely to a device or to a plurality of devices or components of devices disclosed herein through a hole or holes in a sidewall, a side arm or other component of the invention that defines an edge, side or angle of the one or plurality of devices or other components.

As used herein the term "a connector" means any position at which one or more components of the device are in operable contact. In some embodiments, the term "hole" is used interchangeably with the term connector such that a hole can mean a position at which one or more components of the device are in operable contact.

The invention relates to a windguard which can operate in any one of plurality of positions while being used as one component of an agricultural harvester. In some embodiments, windguard comprises a first and a second side arm; and a transverse member relative to the first and second side arms; wherein the first and the second side arms comprise a first hole disposed at or proximate to its rearmost end, a second hole disposed at or proximate to its front end; and wherein the first and second side arms define a space within which the transverse member is rotatably mounted at the second hole of the first and second side arms; wherein the first and the second side arms are in operable contact with the at least one cam; wherein the first hole of each of the first and second side arms are adapted for mechanical connection to a pickup assembly. In some embodiments the pickup assembly comprises a pair of oppositely positioned sidewalls, wherein each sidewall comprises at least one cam positioned on the outside lateral faces of the sidewall. The invention relates to an agricultural harvester comprising the windguard or the crop collection system disclosed herein. The invention also relates to the ability of at least one cam positioned on the outside lateral face of one or more sidewalls to slide within the at least one elongated slots positioned on the first and/or second side arms as pitch of the ground and height of windrows of crop material change during operation of an agricultural harvester comprising the windguard or the crop collection system disclosed herein. If the agricultural harvester is collecting crop in a field of varied heights, the windguard will, in some embodiments, maintain the distance between it and one or more components of the pickup assembly so that the tines of the pickup assembly will not become obstructed by crop material or the windguard itself or a combination of the windguard and crop materials entering the pickup assembly. The sliding movement of the cam on the side arms allows for moment of the windguard relative to the pickup assembly so that there is no obstruction of the pickup guard as the pickup tines rotate in operation. In some embodiments, the sliding motion or movement of the cam in the slot allows the windguard to automatically adjust during operation without manual adjustment or pre-adjustment prior to operation.

The invention further relates to a crop collection system comprising a pickup assembly comprising a pair of oppositely positioned sidewalls, wherein each sidewall comprises at least one cam positioned on the outside lateral faces of the sidewall; and a windguard comprising: a first and a second side arm; and a transverse member relative to the first and second side arms; wherein the first and the second side arms comprise a first hole positioned at or proximate to its rearmost end, a second hole positioned at or proximate to its front end; and wherein the first and second side arms define a space within which the transverse member is rotatably mounted at the second hole of the first and second side arms; wherein the first and the second side arms are in operable contact with the at least one cam.

In some embodiments, the invention relates to any of the crop collection systems or windguards disclosed herein, wherein the windguard further comprises: a first and a second pivot tab; wherein the first and the second side arms comprise an elongate slot disposed proximate to the front end of the first and second side arm and behind the second hole; and wherein the first and the second pivot tabs are affixed to, operably coupled or mechanically linked around opposite ends of the transverse member adjacent to the inside face of the first and second side arms and wherein the first and second pivot tabs comprise a windguard cam adapted to slide within the elongate slot of the first and second side arms. In some embodiments movement of any of the crop collection systems or windguards disclosed herein is accomplished by sliding action of the cam in the one or more elongated slots and/or the first and second pivot tabs.

In some embodiments, the invention relates to any of the crop collection systems or windguards disclosed herein, wherein the windguard further comprises a second transverse member rotatably mounted between a pair of laterally spaced end plates rigidly affixed to the front end of the first and second side arms. In some embodiments, the invention relates to any of the crop collection systems or windguards disclosed herein, wherein the transverse member supports one or a plurality of tines extending rearwardly. In some embodiments, the invention relates to any of the crop collection systems or windguards disclosed herein, wherein the elongate slots of the first and second side arms allow for radial movement of the first and second pivot tabs and rotational movement of the transverse member relative to an axis defined by the transverse member.

In some embodiments, the invention relates to any of the crop collection systems or windguards disclosed herein, wherein the second transverse member comprises a cylindrically shaped surface and one or a plurality of evenly spaced tread lines extending lengthwise on the cylindrically shaped surface. In some embodiments, the invention relates to any of the crop collection systems or windguards disclosed herein, wherein the length of the first and second transverse members are substantially the same.

In some embodiments, the invention relates to any of the crop collection systems or windguards disclosed herein, wherein the pickup assembly further comprises a pickup guard and the pickup assembly is attached to the windguard at the first hole of the first and second sidearms; and wherein the first hole of the first and second sidearms defines a pivot point such that, upon operation, the windguard can automatically adjust its position through rolling contact between the first and second side arms and the cam to maintain a constant distance between the tines of the windguard and the pickup guard.

In some embodiments, the invention relates to any of the crop collection systems or windguards disclosed herein, wherein the first and second side arms have tapered bottom edges from front to back and both the first and second sidearms are in operable contact with a pair of cams, each of which is positioned on the outside lateral face of the sidewalls of the pickup assembly, such that, upon operation, the windguard can automatically adjust its position with the pickup assembly through rolling contact between: (i) the first and second side arms and (ii) the pair of cams to maintain a predetermined, unobstructed distance between the windguard and the pickup guard. In some embodiments, the invention relates to any of the crop collection systems or windguards disclosed herein, wherein the pickup assembly and/or windguard are both rotatably mounted to a frame of an agricultural harvester.

In some embodiments, the invention relates to any of the crop collection systems or windguards disclosed herein, wherein at least a portion of the shape of the sidearm of the windguard is tapered such that the raising and lowering of the pickup adjusts the position of the windguard with respect to the cam such that a distance is generally maintained between a lower surface of the tines and an upper surface of the pickup. In some embodiments, the invention relates to any of the crop collection systems or windguards disclosed herein, wherein the lower shape of at least one sidearm, and optionally both, is configured for contact with the cam and tapered upwardly with respect to a crop flow direction.

In some embodiments, the invention relates to any of the crop collection systems or windguards disclosed herein, wherein a lower portion of the sidearm of the windguard is shaped to have at least three separately shaped stages configured for corresponding contact with the cam when the pickup is in a lowered position, a raised position and a transition position therebetween. In some embodiments, the at least one sidearm of the windguard is tapered at least in a middle stage corresponding to a transitional position of the pickup.

The invention also relates to a method of harvesting crop material in an agricultural harvester disclosed herein comprising: contacting crop material with any disclosed windguard and or crop collection system comprising a cam, wherein the cam allows radial movement of at least the first pivot tab and the transverse member so that the distance between the windguard and the pickup mechanism can adjust automatically during operation in one or a plurality of operational positions each of which allows for maintaining a constant distance between one or more components of the disclosed pickup assembly and one or more components of the disclosed windguard. The invention also relates to a method of harvesting crop material in an agricultural harvester disclosed herein comprising: contacting crop material with any disclosed windguard and or crop collection system comprising a cam and a first and second pivot tab, wherein the cam allows radial movement of at least the first pivot tab and the transverse member so that the distance between the windguard and the pickup mechanism can adjust automatically during operation in one or a plurality of operational positions each of which allows for maintaining a constant distance between one or more components of the disclosed pickup assembly and one or more components of the disclosed windguard. In some embodiments, the cam allows radial movement of at least the first pivot tab and the transverse member so that the distance between the windguard and the pickup mechanism can adjust automatically during operation in one or a plurality of operational positions each of which allows for maintaining a constant distance between the the pickup guard and one or more slots of the windguard positioned on the first and/or second side arms. In some embodiments, the method does not comprise manual adjustment or pre-adjustment prior to operation of the harvester.

FIG. 1A shows an exemplary windguard 10, that includes a pair of side arms 25 with a first hole 32 at their rearmost end, a second hole 30 on its inner face at or proximate to their front end, and a slot 16 positioned proximate to the second hole 30. In the depicted embodiment, the slot 16 is an elongate slot. The pair of side arms 25 define a space within which a transverse member 19 is mounted at the second hole 30. Evenly spaced holes 26 along the length of the transverse member 19 receive a plurality of tines 20 that extend rearwardly between the side arms 25. In the depicted embodiment, a pair of laterally spaced end plates 45 (only one shown) are fastened to the first and second sidearms 25 at or proximate to the front end of the first and second side arms 25. A rotary feeder 40 is rotatably mounted to the front end of the pair end plates 45 about its axis. In the depicted embodiment the rotary feeder 40 has a cylindrical shape that comprises evenly spaced treads 29 extending lengthwise on the outer surface of the rotary feeder 40. A pair of pivot tabs 15 (only one depicted) are affixed to the transverse member 19 adjacent to the inner face of the pair of side arms 25. The pivot tabs 15 either comprise or are operably coupled to a windguard cam (not depicted) arranged to slide in the elongate slot 16 of the first and second side arms 25 during operation of the windguard.

Figure 1B:
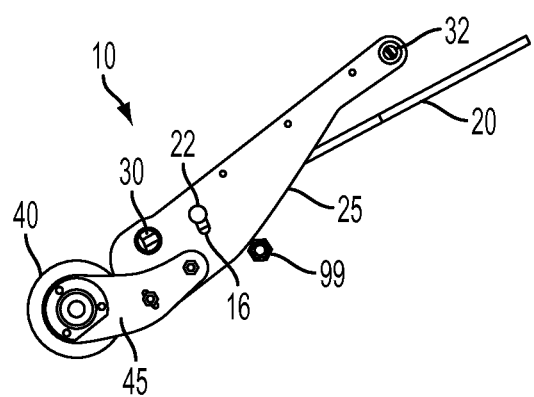
FIG. 1B illustrates a side view of a windguard comprising a two pivot tabs operably coupled to a transverse member according to an embodiment.

FIG. 1B depicts a side view of the windguard in which a first of two side arms 25 comprises a first hole 32 at the rear end and a second hole 30 at the front end of the side arm 25. The transverse member (not shown) is rotatably mounted in the second hole 30. The windguard cam 22 which is affixed to a pivot tab (not shown) is aligned to fit within the elongate slot 16. The windguard cam motion in the elongate slot 16 allows radial movement of the pivot tab and tines 20 which are affixed to the transverse member and extend rearwardly in relation to the windguard. In the depicted embodiment, a first of two end plates 45 is affixed to the front end of the side arm 25. The distance between the end plates 45 define a space within which a rotary feeder 40 is rotatably mounted to the front of the end plates 45. A cam 99 that is affixed to one or both sidewalls of the pickup assembly (not depicted) is in operable contact with the bottom edge of the sidearm 25 of the windguard 10.

Figure 1C:
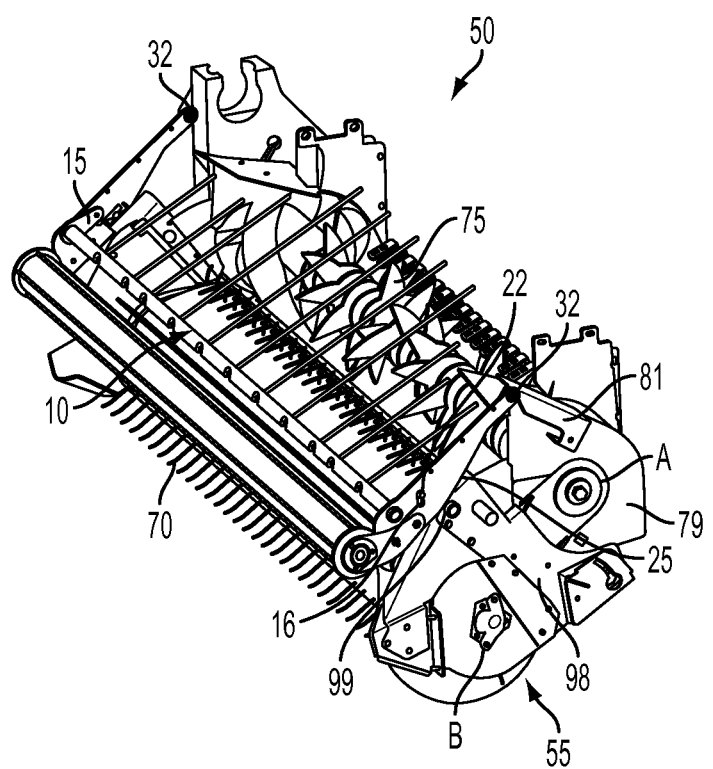
FIG. 1C depicts a perspective view of an embodiment in which a windguard is affixed to a pickup assembly.

As shown in FIG. 1C, the depicted embodiment of the pickup mechanism 50 includes a pickup assembly 55 arranged with a windguard 10. The pickup assembly comprises a crop cutter 75 that is rotatably mounted about axis A and a pickup (not shown) rotatably mounted about axis B. Evenly spaced pickup tines 70 on the pickup draw crop material in windrows into the front end of the pickup mechanism 50 during operation. The rotating tines 70 will carry crop material circumferentially from the pickup to the crop cutting device 75. Crop material can be then fed into a bale chamber, combine, sugarcane harvester, cotton harvester or other agricultural device that stores or bales harvested crop material. In some embodiments, the pickup mechanism is adapted for alignment with a bale chamber aboard an agricultural harvester selected from: a baler, a combine, a sugarcane harvester, or a cotton harvester. The windguard 10 is pivotably mounted to the top of the side plate 79 of the pickup assembly 55 at the first hole 32 of the windguard 10. A fastener (not depicted) operably couples the side arm 25 of the windguard to a guide arm 81 of the pickup assembly 55 as well as the side plate 79 of the pickup assembly 55. The second hole 32 of the windguard 10 acts a a pivot point for opening and closing angular movement of the side arms 25 and the guide arm 81 during operation of the pickup mechanism 50. If the agricultural harvester upon which the pickup mechanism 50 is affixed is driven across a dip or a relatively low level of windrowed crop material the entire pickup mechanism can pivot downward at axis A. If the agricultural harvester upon which the pickup mechanism 50 is affixed is driven across a dip or relatively low level of windrowed crop material the windguard 10 can pivot downward independently from the movement of the pickup mechanism 50 so that the windguard can a sufficiently prevent crop material from blowing away from any space between the windguard and the pickup assembly. If the agricultural harvester upon which the pickup mechanism 50 is affixed comes across a hill or a relatively high level of windrowed crop material the windguard 10 can pivot upward with the movement pickup mechanism 50 so that the space between the windguard and the pickup assembly 55 is large enough to prevent plugging of the pickup mechanism 50. In some embodiments, if the agricultural harvester upon which the pickup mechanism 50 is affixed comes across a hill or a relatively high level of windrowed crop material the windguard 10 can pivot upward with the movement pickup mechanism 50 such that the cam 99 attached to the pickup assembly sidewall 98 slides and/or rolls along the bottom edge of the side arm 25 and in doing so the distance between the windguard and the pickup assembly 55 is maintained at a constant distance to prevent plugging of the pickup mechanism 50. In some embodiments, the distance remains constant between the windguard slot 16 and the pickup guard (not depicted). In the depicted embodiment, the windguard has two degrees of freedom to maximize the flexibility of the windguard and improve performance by the angular movement of the device at the pivot point of the first hole 32 and the sliding movement of the windguard cam through the elongate slot 16. The pivot point at the first hole 32 allows for a scissor-like movement of a component of the pickup mechanism 50, and the sliding movement of the windguard cam in the elongate slot 16 allows for radial movement of the pivot tab 15 and tines 20 on the windguard 10. In some embodiments, the crop cutter 75 of the pickup mechanism 50 is replaced with any device that feeds crop material into a bale chamber. In some embodiments, the pickup mechanism 50 is adapted to align it rearmost end to the entry point of a bale chamber. In some embodiments, the pickup mechanism 50 is adapted to align its front most end to a towing device which allows a tractor or similar vehicle to tow the pickup mechanism over windrowed crop material. In some embodiments, the pickup mechanism 50 is adapted to harvest crop material selected from one or a plurality of: grain, straw, legumes, and the like.

Figure 2A:
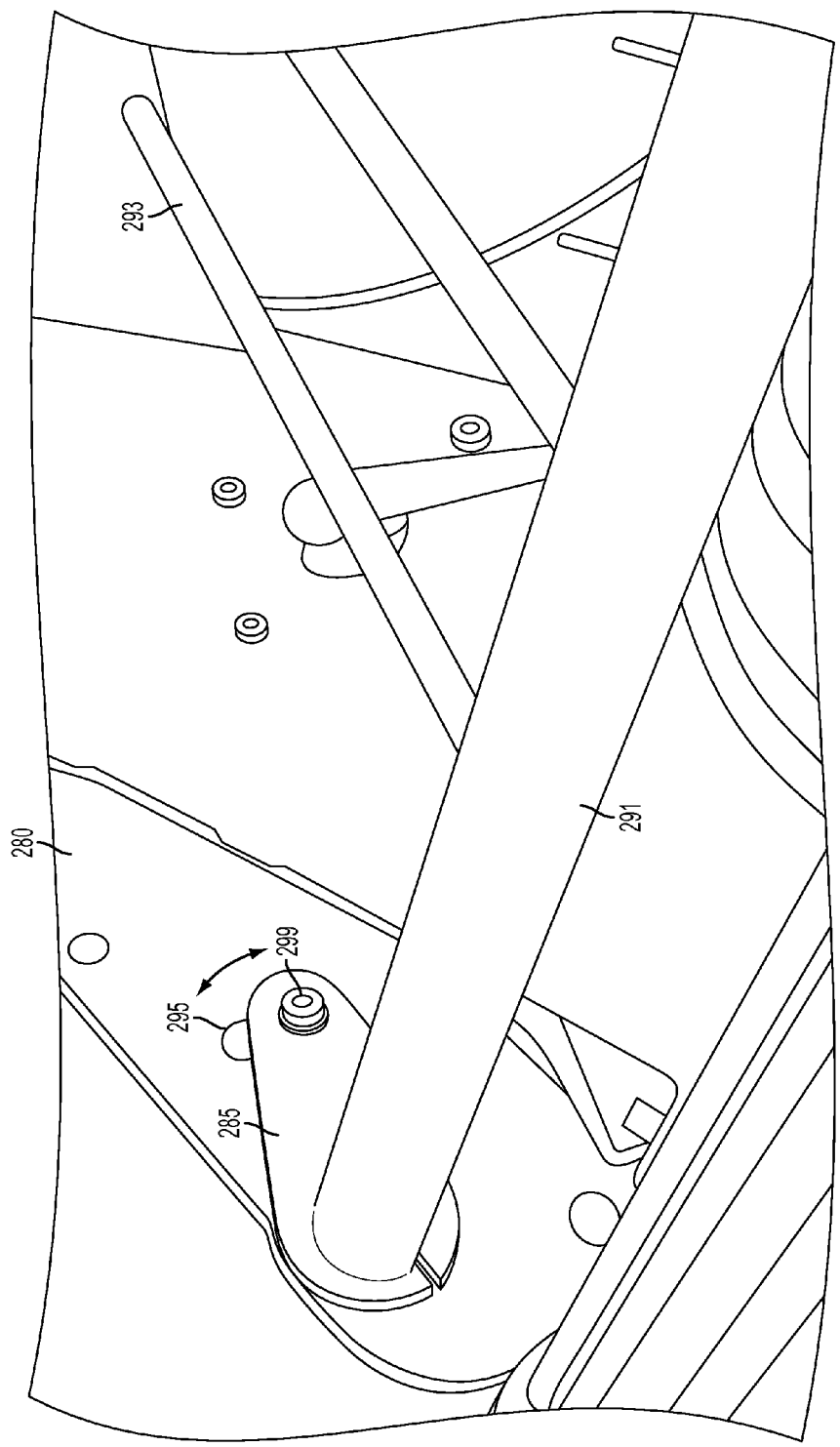
FIG. 2A depicts a perspective view of one side of a windguard comprising a side arm, transverse member, and a pivot tab that illustrates the radial movement accomplished by the windguard during operation.

FIG. 2A depicts a perspective view of one inner side of a windguard arranged on a pickup assembly, wherein the windguard comprises a pair of side arms 280 (second side arm not depicted), transverse member 291, and a pivot tab 285 (only one depicted). Tines 293 are rigidly affixed to the rear-facing surface of the transverse member 291 and extend rearwardly. The depicted pivot tab 285 is operably coupled to the transverse member 291 at a position immediately adjacent to the inner face of the side arm 280. The pivot tab 285 comprises a windguard cam 299 that is positioned transverse to the rearwardly end of the pivot tab 285 and adapted for alignment with a slot 295 that allows radial movement of the pivot tab 285 during operation of the pickup mechanism. Radial movement is illustrated by the double-headed arrow and is accomplished by sliding of the windguard cam 299 in the slot 295. The radial movement of the windguard cam allows pivoting movement of tines upward and downward depending upon the contour of the ground upon which the pickup mechanism operates and the positional movement of the pickup assembly.

Figure 2B:
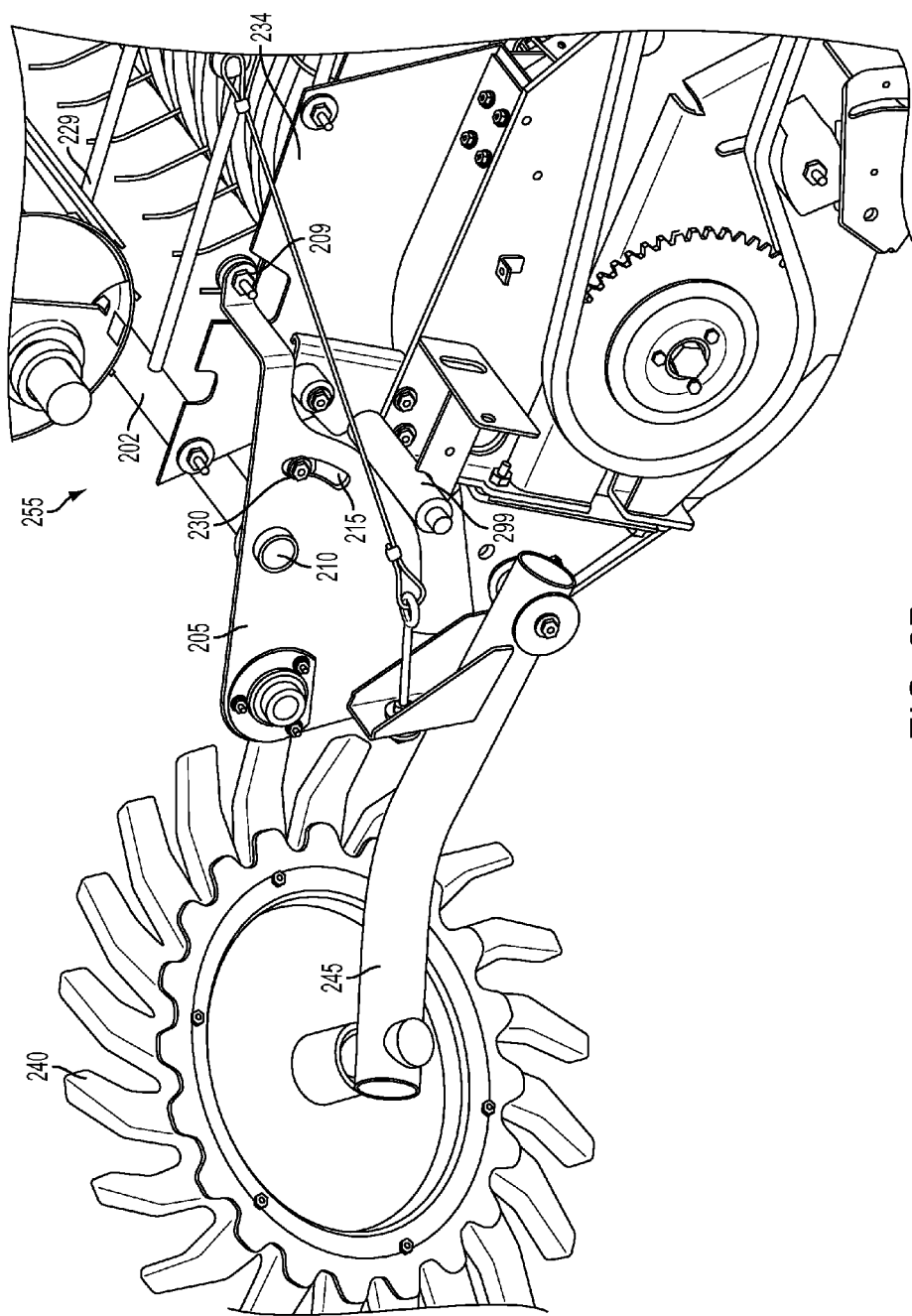
FIG. 2B depicts another perspective view of the outer side of an embodiment in which a side arm of the windguard is mounted onto a pickup assembly that comprises an agricultural implement at its front end.

FIG. 2B depicts a perspective view of the outer side of an embodiment in which a side arm 205 of the windguard is mounted onto a pickup assembly. In this embodiment, one of two side arms 205 is rigidly affixed to a top side panel 234 of the pickup assembly 255 side at a first hole 209 that is on the rearmost edge of the side arm 205. Similar to other depicted embodiments, the side arm comprises a second, additional hole 210 that serves as a pivot point for a transverse member 202 positioned between the two side arms 205 (only one depicted). The transverse member is rotationally mounted at the second hole and allows for axial movement of evenly spaced tines 229 during operation of the pickup mechanism. A windguard cam 230 that is operably coupled to a pivot tab (not shown) is adapted to slide within a slot 215 positioned in the side arm 205. The radial movement of the cam within the slot of the side arm allows the height and pitch of the windguard to accommodate variable sized windrows and variable heights or depths of the ground during the operation of the pickup mechanism. The windguard allows the sliding movement, or cam action, to raise and lower pitch of windguard without manual adjustment prior to or during operation of the apparatus. The windguard cam also allows the sliding movement, or cam action, to raise and lower pitch of windguard without manual adjustment prior to or during operation of the apparatus. In the depicted embodiment, a rotary crop cutter 240 is rigidly attached to the pickup mechanism by curved bar 245 that extends in front of the windguard. The curved bar is attached to a side panel of the pickup assembly by a fastener positioned below the side arm 205 of the windguard. One of ordinary skill in the art could attach any desirable agricultural implement to the front of the pickup assembly for adapted operation of the mechanism. A cam 299 is affixed to the side plate 234 of the pickup assembly 255 such that the sloped bottom edge of the side arm 205 slides along the cam 299 when the windguard is adjusting its position with respect to the ground.

In some embodiments, the pickup assembly comprises additional equipment which is rigidly affixed to the pickup assembly by a fastener, member, bar or the like. In some embodiments, the agricultural implement extends frontward or laterally from the pickup assembly.

Figure 3A:
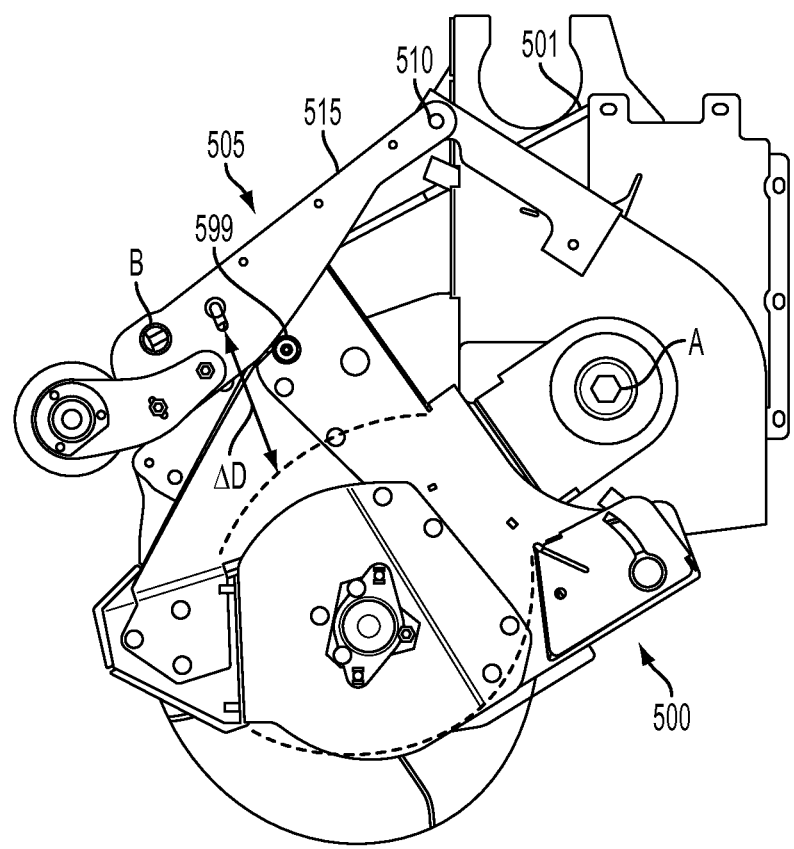
FIGS. 3A and 3B depicts a side view of an embodiment in which a pickup assembly comprising a windguard is in two different phases of operation.
Figure 3B:
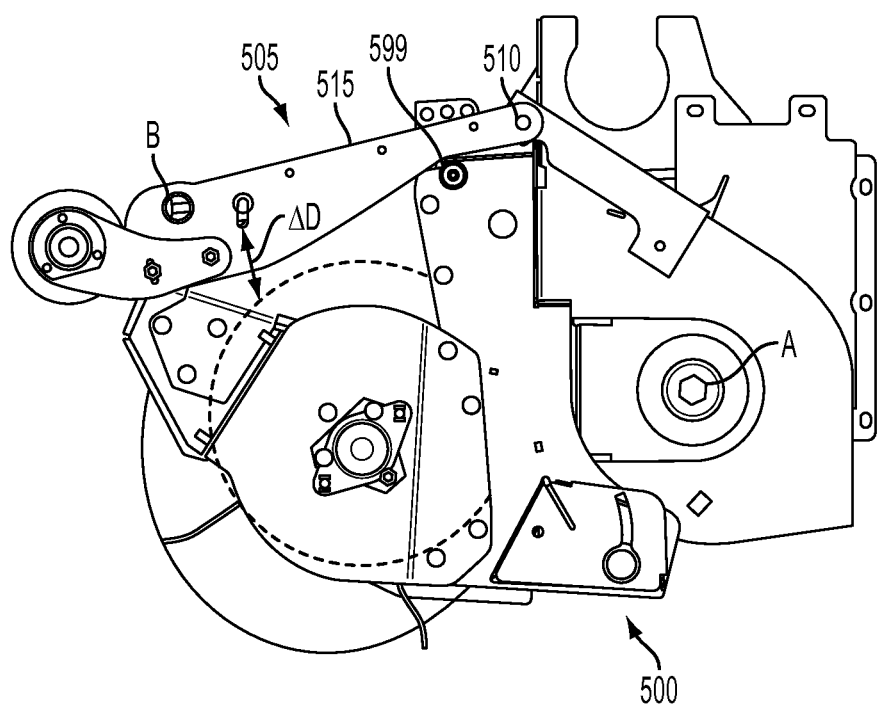

FIGS. 3A and 3B depict a side view of an embodiment in which a pickup assembly 500 comprising a windguard 505 is in two different phases of operation. As the size of the windrow varies during operation of the pick-up mechanism 500, the bar (not depicted) and the tines 501 (one tine depicted) will float upward and downward with respect to a transverse member (not depicted) to automatically adjust the windguard 505 to varying windrow size and to provide the windguard 505 with an unlimited number of adjustment positions for different windrow sizes. FIG. 3A depicts an operational phase of the pickup mechanism in which the pickup assembly 500 pivotally mounted at axis A is positioned in its lowermost setting relative to the axis A. If the pickup mechanism is being operated at or near a ditch or decline in the contour of the ground, the operator can adjust the pickup mechanism so that the position of the pickup tines are as proximate to the ground as possible. Without operator control or pre-setting, the pivot point at hole 510 allows for a scissor-like angular movement of the side arms of the windguard 515 to adjust the height of the windguard relative to the pickup mechanism. Without operator control or presetting, the pivot point B at the axis of the transverse member allows the tines affixed to the transverse member and pivot tabs (not depicted) of the windguard to move radially relative to the side arms 515. Cam 599 is in operable contact with the bottom edge of sidearm 515, such that when the pickup assembly is in a lower position the cam is in operable contact with the front portion of the sidearm. Dotted lines in both FIGS. 3A and 3B denote the location of the pickup guard. In FIG. 3B, when the pickup assembly is in operable contact with the back portion of the sidearm, the cam 599 has slid across the bottom edge of the sidearm 515 to its rear portion. The sliding motion, or camming motion, toward the tapered bottom edge of the sidearm 515 maintains a constant distance (depicted as ΔD) (between the windguard slot 16 and the pickup guard (dashed line) in any adjustable position of the pickup assembly and the windguard.

FIG. 3B depicts an operational phase of the pickup mechanism in which the pickup assembly 500 pivotally mounted at axis A is positioned in its highest setting relative to axis A. If the pickup mechanism is being operated at or near a hill or incline in the contour of the ground, the operator can adjust the pickup mechanism so that the position of the pickup tines are at a distance from the ground that ensures rotational movement of the pickup without obstruction. Without operator control or pre-setting, the pivot point at hole 510 allows for a scissor-like angular movement of the side arms 515 of the windguard 505 to adjust the height of the windguard 505 relative to the pickup mechanism. Without operator control or pre-setting, the pivot point B at the axis of the transverse member (not depicted) allows the tines (not depicted) affixed to the transverse member and pivot tabs of the windguard to move radially relative to the side arms 515.

In some embodiments, the invention relates to an agricultural harvester comprising a bale chamber wherein the bale chamber comprises a first sidewall and a second sidewall; an outlet at the rear of the bale chamber; and a bale carrier, the bale carrier movable among a closed position and one or more open positions, comprising: a first pair of arms extending in parallel transversely from and affixed to a first pair of pivot points on the first and second sidewalls; a second pair of arms extending in parallel transversely from and affixed to a second pair of pivot points on the first and second sidewalls; one or more fixed members; and a pair of parallel bars extending orthogonal to and affixed to the one or more fixed members, wherein the bale carrier uncovers the outlet at the rear of the bale chamber through which the bale becomes ejected from the bale chamber when the bale carrier is raised upward from its closed position. Balers known in the art may be adapted for use with the windguard and pickup assembly disclosed herein. In some embodiments, the agricultural harvesters comprise one or more agricultural harvesters disclosed in U.S. patent application Ser. Nos. 13/308,304 and 13/784,133, filed Nov. 30, 2011 and May 15, 2012, respectively (which are incorporated by reference in their entireties) that are adapted to comprise the windguard and/or pickup assembly discussed herein.

In some embodiments, the baler further comprises a motor operatively coupled to the first pair of arms and/or the second pair of arms for facilitating the upward or downward movement of the bale carrier.

In some embodiments, the invention relates to an agricultural harvester that comprises the bale ejection system. In some embodiments, the agricultural harvester is a machine chosen from: a combine, a round baler, a waste baler, sugarcane harvester and a cotton harvester.

The aforementioned examples are intended to illustrate, not to limit, the invention. Each of the various publications, including patents and published patent applications, that are cited throughout the application are incorporated by reference in their entireties.

What is claimed is:

1. A crop collection system comprising:
   a pickup assembly comprising a pair of oppositely positioned sidewalls and a pickup guard,
   wherein at least one sidewall comprises a cam positioned on the lateral face of the sidewall; and
   a windguard comprising:
      a first and a second side arm; and
      a transverse member relative to the first and second side arms;
   wherein the first and the second side arms comprise a first connector disposed at or proximate to its rearmost end, a second connector disposed at or proximate to its front end; and wherein the first and second side arms define a space within which the transverse member is rotatably mounted at the second connectors of the first and second side arms; and the first connectors of each of the first and second side arms are adapted for connection to the pickup assembly;
      wherein the pickup assembly is attached to the windguard at the first connectors of the first and second side arms; and
      wherein the first connectors of the first and second sidearms define a pivot point such that upon operation, the windguard can automatically adjust an angle of orientation of the windguard as a point of contact between the at least one cam and at least one sloped surface of the corresponding side arm is changed, such that a distance between the windguard and the pickup guard is controlled;
      wherein a lower portion of the sidearm of the windguard comprising the sloped surface is shaped to have at least three separately shaped stages configured for corresponding contact with the cam when the pickup is in a lowered position, a raised position and a transition position therebetween.

2. The crop collection system of claim 1, wherein the windguard further comprises:
   a first and a second pivot tab; wherein the first and the second side arms comprise an elongate slot disposed proximate to the front end of the first and second side area and behind the second connector; and wherein the first and the second pivot tabs are affixed to, operably coupled or mechanically linked around opposite ends of the transverse member adjacent to the inside face of the first and second side arms and wherein the first and second pivot tabs comprise a windguard cam adapted to slide within the elongate slot of the first and second side arms.

3. The crop collection system of claim 1, wherein the windguard further comprises a second transverse member rotatably mounted between a pair of laterally spaced end plates rigidly affixed to the front end of the first and second side arms.

4. The crop collection system of claim 1, wherein the transverse member supports one or a plurality of tines extending rearwardly.

5. The crop collection system of claim 2, wherein the elongate slots of the first and second side arms allow for radial movement of the first and second pivot tabs and rotational movement of the transverse member relative to an axis defined by the transverse member.

6. The crop collection system of claim 3, wherein the second transverse member comprises a cylindrically shaped surface and one or a plurality of evenly spaced tread lines extending lengthwise on the cylindrically shaped surface.

7. The crop collection system of claim 3, wherein the length of the first and second transverse members are substantially the same.

8. The crop collection system of claim 1, wherein each of the first and second side arms comprise a bottom edge, and each bottom edge comprising a sloped surface of the at least one sloped surface and wherein the windguard can automatically adjust its position through rolling contact between the bottom edge of the first and second side arms and the cam to maintain a constant distance between the tines of the windguard and the pickup guard.

9. The crop collection device of claim 8, wherein the first and second side arms have tapered bottom edges from front to back and both the first and second sidearms, which comprise the at least one sloped surface and are in operable contact with a pair of cams, each of which is positioned on the outside lateral face of the sidewalls of the pickup assembly, such that, upon operation, the wind guard can automatically adjust its position with the pickup assembly through rolling contact between: (i) the first and second side arms and (ii) the pair of cams to maintain a predetermined, unobstructed distance between the windguard and the pickup guard.

10. The crop collection system of claim 1, wherein the pickup assembly and windguard are both rotatably mounted to a frame of an agricultural harvester.

11. The crop collection system of claim 1, wherein at least a portion of the shape of the sidearm of the windguard comprises the at least one sloped surface such that the raising and lowering of the pickup adjusts the position of the windguard with respect to the cam such that a distance is generally maintained between a lower surface of the tines and an upper surface of the pickup.

12. The crop collection system of claim 1, wherein the corresponding side arm to the at least one cam is tapered such that the at least one sloped surface is sloped upwardly with respect to a crop flow direction.

13. An agricultural harvester comprising the crop collection system of claim 1.

14. The agricultural harvester of claim 13, wherein the agricultural harvester further comprises a pickup assembly adapted for attachment to the windguard by a fastener affixed through the first holes of each of the first or second side arms.

15. The agricultural harvester of claim 14, wherein the fastener allows pivotal movement of the side arm relative to the pickup assembly.

16. A method of harvesting crop material in an agricultural harvester of claim 13 comprising:
contacting crop material with the windguard comprising a cam and a first and second pivot tab, wherein the cam allows radial movement of at least the first pivot tab and the transverse member so that the distance between the windguard and the pickup mechanism can adjust automatically during operation.

17. A windguard comprising:
a first and second side arm, each first and second side arm comprising a bottom edge; and
a transverse member relative to the first and second side arms;
wherein the first and the second side arms comprise a first-connector disposed at or proximate to its rearmost end, a second connector disposed at or proximate to its front end; and wherein the first and second side arms define a space within which the transverse member is rotatably mounted at the second connector of the first and second side arms;
wherein the bottom edge of at least one of the first and the second side arms has a portion with a sloped surface with respect to a length of the arms and positioned for operable contact with at least one cam attached to a pickup assembly such that an angle of orientation of the windguard is changed as a point of contact between the at least one cam and the sloped surface is moved; and wherein the first connector of each of the first and second side arms are adapted for mechanical connection to the pickup assembly.

* * * * *